United States Patent
Vajravel et al.

(10) Patent No.: US 11,119,968 B2
(45) Date of Patent: Sep. 14, 2021

(54) INCREASING CACHE HITS FOR USB REQUEST BLOCKS THAT TARGET A REDIRECTED USB DEVICE

(71) Applicant: Dell Products L.P., Round Rock, TX (US)

(72) Inventors: Gokul Thiruchengode Vajravel, Rayasandra Bengaluru (IN); Ankit Kumar, Deoghar (IN)

(73) Assignee: Dell Products L.P., Round Rock, TX (US)

( * ) Notice: Subject to any disclaimer, the term of this patent is extended or adjusted under 35 U.S.C. 154(b) by 479 days.

(21) Appl. No.: 16/057,669

(22) Filed: Aug. 7, 2018

(65) Prior Publication Data
US 2020/0050574 A1    Feb. 13, 2020

(51) Int. Cl.
*G06F 13/42*    (2006.01)
*G06F 12/0802*   (2016.01)
*G06F 9/455*    (2018.01)

(52) U.S. Cl.
CPC ...... *G06F 13/4282* (2013.01); *G06F 9/45558* (2013.01); *G06F 12/0802* (2013.01); *G06F 2009/45579* (2013.01); *G06F 2212/621* (2013.01); *G06F 2213/0042* (2013.01)

(58) Field of Classification Search
CPC .. G06F 13/102; G06F 13/385; G06F 13/4282; G06F 9/45558; G06F 12/0802; G06F 2009/45579; G06F 2212/621; H04L 67/2857
USPC .................................................. 710/52, 33
See application file for complete search history.

(56) References Cited

U.S. PATENT DOCUMENTS

| | | | | |
|---|---|---|---|---|
| 2006/0221990 A1* | 10/2006 | Muller | .................... | G06F 13/28 370/412 |
| 2008/0320501 A1* | 12/2008 | Li | ....................... | G06F 9/45537 719/324 |
| 2009/0222841 A1* | 9/2009 | Mirajkar | ............... | G06F 13/102 719/321 |
| 2011/0035758 A1* | 2/2011 | Stoyanov | ............... | G06F 9/4411 719/324 |
| 2016/0179565 A1* | 6/2016 | Chen | ....................... | H04L 67/08 710/313 |
| 2016/0373555 A1* | 12/2016 | Patesaria | ................ | H04L 67/42 |

OTHER PUBLICATIONS

VMware vSpere—Why checking NUMA configurations is so important, Dennis Zimmer, Mar. 5, 2018, pp. 1-7, (Year: 2018).*

* cited by examiner

*Primary Examiner* — Idriss N Alrobaye
*Assistant Examiner* — Brooke J Taylor
(74) *Attorney, Agent, or Firm* — Kirton McConkie; Brian Tucker (57) ABSTRACT

Cache hits are increased for URBs that target a redirected USB device. When a virtual bus driver in a VDI environment queues an IRP for an URB that targets the redirected USB device, it can ensure that the IRP and therefore the URB is completed on the same processor that originated the URB. This can be accomplished in both NUMA and non-NUMA multiprocessor environments.

20 Claims, 10 Drawing Sheets

INCREASING CACHE HITS FOR USB REQUEST BLOCKS THAT TARGET A REDIRECTED USB DEVICE

CROSS-REFERENCE TO RELATED APPLICATIONS

N/A

BACKGROUND

The present invention is generally directed to USB device redirection in a virtual desktop infrastructure (VDI) environment. USB device redirection generally refers to making a USB device that is connected to a client accessible within a virtual desktop as if the USB device had been physically connected to the virtual desktop. In other words, when USB device redirection is implemented, a user can connect a USB device to his or her client terminal and the USB device will function as if it had been connected to the server.

Figure 1:
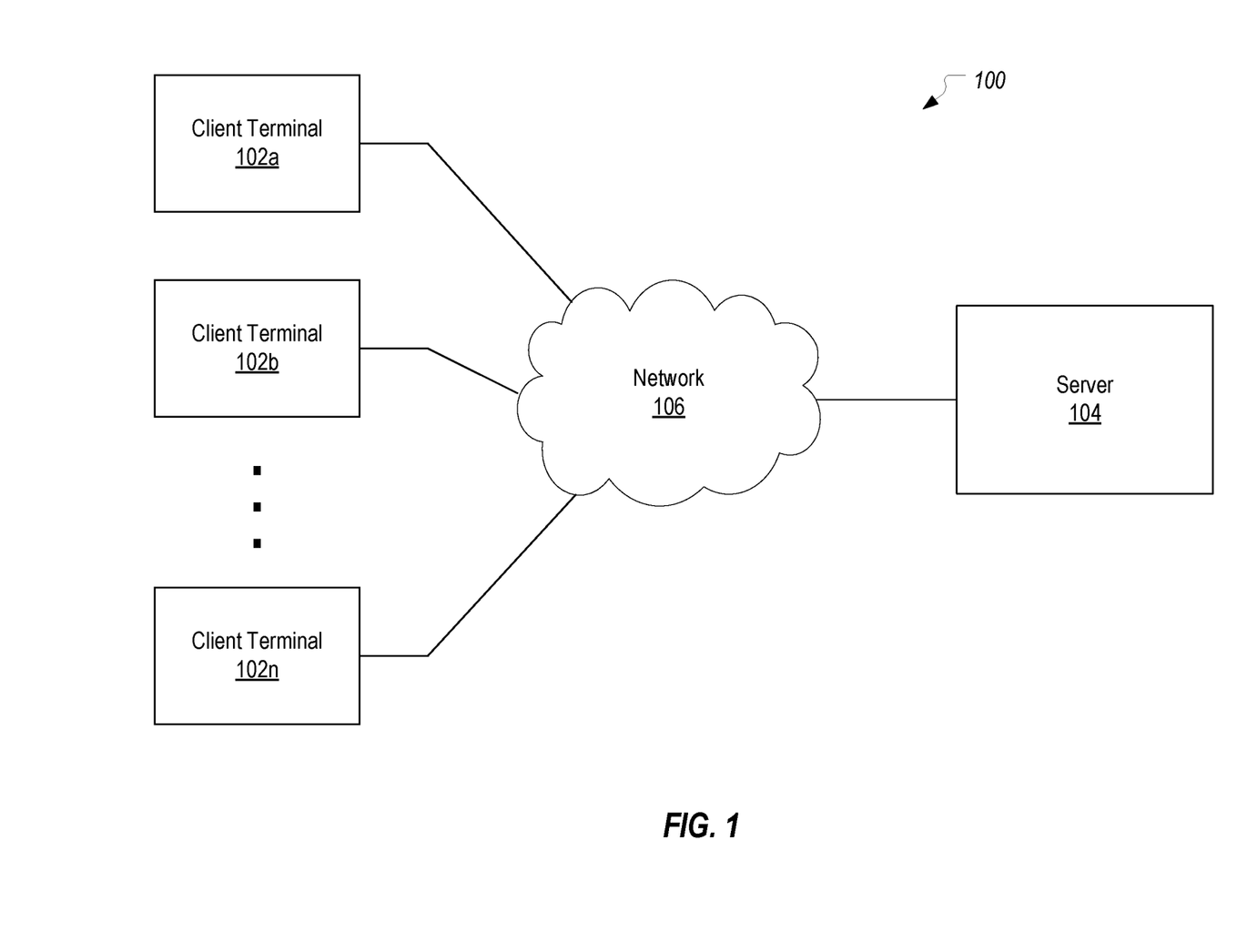
FIG. 1 illustrates an example computing environment in which the present invention can be implemented.
Figure 2:
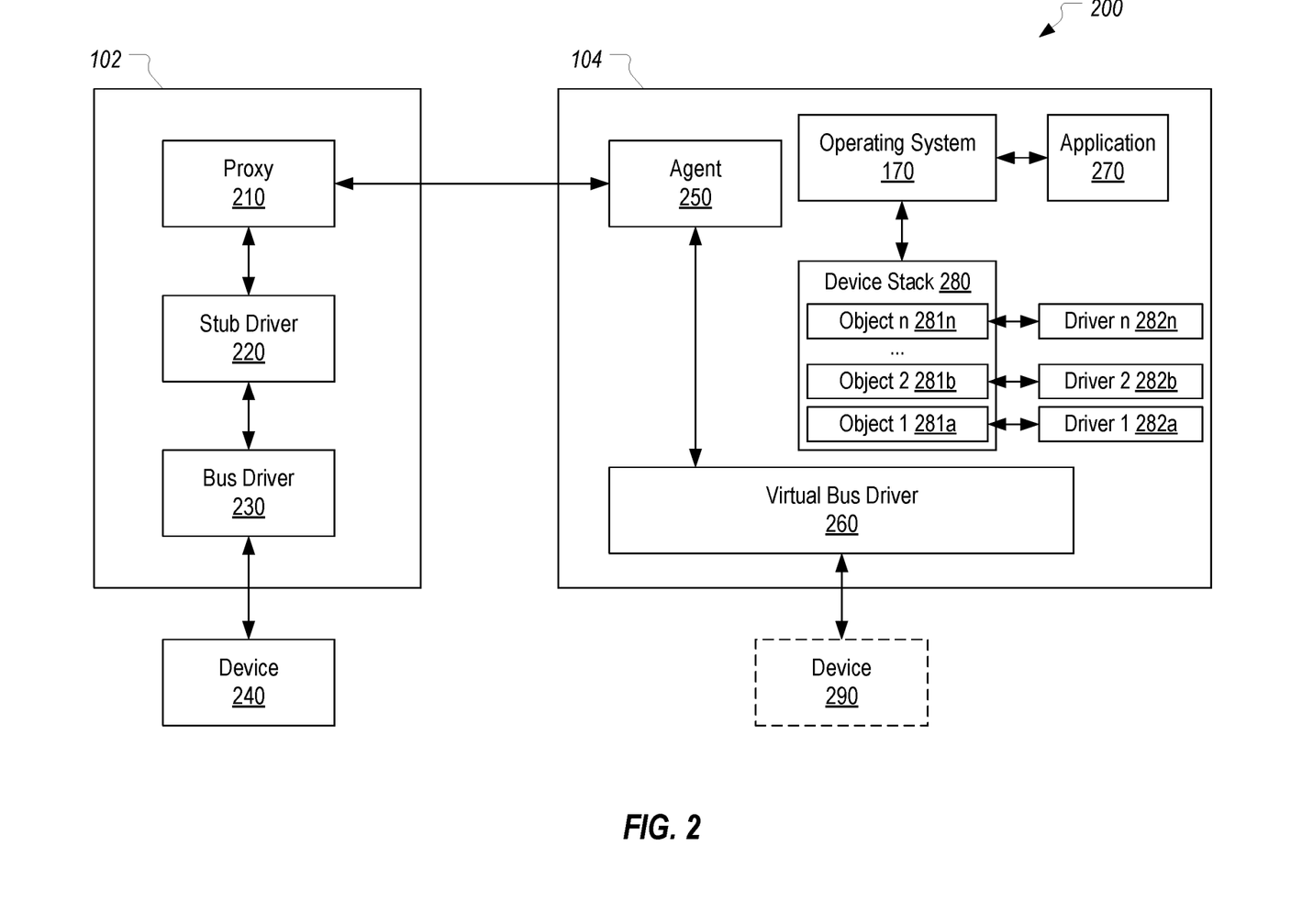
FIG. 2 illustrates how a USB device can be redirected from a client terminal to a server.

FIGS. 1 and 2 and the following description will provide a general overview of how USB device redirection can be implemented in accordance with some embodiments of the present invention. In FIG. 1, a computing system 100 is depicted as including a number of client terminals 102a-102n (referenced generally herein as client(s) 102) in communication with a server 104 via a network 106. Server 104 can be configured to support a remote session (e.g., a remote desktop session) wherein a user at a client 102 can remotely access applications and data at the server 104 from the client 102. Such a connection may be established using any of several well-known techniques such as the Remote Desktop Protocol (RDP) and the Citrix® Independent Computing Architecture (ICA).

Client terminal 102 may represent a computer, a mobile phone (e.g., smart phone), a laptop computer, a thin client terminal, a personal digital assistant (PDA), a portable computing terminal, or a suitable terminal or device with a processor. Server 104 may represent a computer, a laptop computer, a computing terminal, a virtual machine (e.g., VMware® Virtual Machine), a desktop session (e.g., Microsoft Terminal Server), a published application (e.g., Microsoft Terminal Server) or a suitable terminal with a processor.

Client 102 may initiate a remote session with server 104 by sending a request for remote access and credentials (e.g., login name and password) to server 104. If server 104 accepts the credentials from client 102, then server 104 may establish a remote session, which allows a user at client 102 to access applications and data at server 104. During the remote session, server 104 sends display data to client 102 over network 106, which may include display data of a desktop and/or one or more applications running on server 104. The desktop may include, for example, icons corresponding to different applications that can be launched on server 104. The display data allows client 102 to locally display the desktop and/or applications running on server 104.

During the remote session, client 102 may send user commands (e.g., inputted via a mouse or keyboard at client 102) to server 104 over network 106. Server 104 may process the user commands from client 102 similar to user commands received from an input device that is local to server 104. For example, if the user commands include mouse movements, then server 104 may move a pointer on the desktop running on server 104 accordingly. When the display data of the desktop and/or application changes in response to the user commands, server 104 sends the updated display data to client 102. Client 102 locally displays the updated display data so that the user at client 102 can view changes at server 104 in response to the user commands. Together, these aspects allow the user at client 102 to locally view and input commands to the desktop and/or application that is running remotely on server 104. From the perspective of the client, the desktop running on server 104 may represent a virtual desktop environment.

FIG. 2 is a block diagram of a local device virtualization system 200 in accordance with embodiments of the present invention. System 200 may include client 102 in communication with server 104 over network 106 as illustrated in FIG. 1. Client 102 may include a proxy 210, a stub driver 220, and a bus driver 230. Client 102 can be connected to a device 240, as shown in FIG. 2. Server 104 may include an agent 250 and a virtual bus driver 260.

In accordance with USB device redirection techniques, while device 240 is not locally or physically connected to server 104 and is remote to server 104, device 240 appears to server 104 as if it is locally connected to server 104, as discussed further below. Thus, device 240 appears to server 104 as a virtual device 290.

By way of illustration and not limitation, device 240 may be any type of USB device including a machine-readable storage medium (e.g., flash storage device), a printer, a scanner, a camera, a facsimile machine, a phone, an audio device (e.g., a headset), a video device (e.g., a camera), a peripheral device, or other suitable device that can be connected to client 102. Device 240 may be an external device (i.e., external to client 102) or an internal device (i.e., internal to client 102). For purposes of this application, device 240 can represent an authentication device such as a smart card.

Bus driver 230 can be configured to allow the operating system and programs of client 102 to interact with device 240. In one aspect, when device 240 is connected to client 102 (e.g., plugged into a port of client 102), bus driver 230 may detect the presence of device 240 and read information regarding device 240 ("device information") from device 240. The device information may include features, characteristics and other information specific to device 240 such as a device descriptor (e.g., product ID, vendor ID and/or other information), a configuration descriptor, an interface descriptor, an endpoint descriptor and/or a string descriptor. Bus driver 230 may communicate with device 240 through a computer bus or other wired or wireless communications interface.

In accordance with USB device redirection techniques, device 240 may be accessed from server 104 as if the device were connected locally to server 240. Device 240 may be accessed from server 104 when client 102 is connected to server 104 through a remote session running on server 104. For example, device 240 may be accessible from the desktop running on server 104 (i.e., virtual desktop environment). To enable this, bus driver 230 may be configured to load stub driver 220 as the default driver for device 240. Stub driver 220 may be configured to report the presence of device 240 to proxy 210 and to provide the device information (e.g., device descriptor) to proxy 210. Proxy 210 may be configured to report the presence of device 240, along with the device information, to agent 250 of server 104 over network 106 (e.g., via a TCP or UDP socket). Thus, stub driver 220 redirects device 240 to server 104 via proxy 210.

Agent 250 may be configured to receive the report from proxy 210 that device 240 is connected to client 102 and the device information. Agent 250 may further be configured to associate with the report from proxy 210 one or more identifiers for client 102 and/or for a remote session through which client 102 is connected to server 104, such as a session number or a session locally unique identifier (LUID). Agent 250 can provide notification of device 240, along with the device information, to virtual bus driver 260. Virtual bus driver 260 (which may be a Dell Wyse TCX USB bus driver, or any other bus driver) may be configured to create and store in memory a record corresponding to device 240. This record may include at least part of the device information and session identifiers received from agent 250. Virtual bus driver 260 may be configured to report to operating system 170 of server 104 that device 240 is connected and to provide the device information to the operating system. This allows the operating system of server 104 to recognize the presence of device 240 even though device 240 is connected to client 102.

The operating system of server 104 may use the device information to find and load one or more appropriate device drivers for device 240 at server 104. Each driver may have an associated device object (object(s) 281a, 281b, . . . , 281n, referred to generally as device object(s) 281), as illustratively shown in FIG. 2. A device object 281 is a software implementation of a real device 240 or a virtualized (or conceptual) device 290. Different device objects 281 layer over each other to provide the complete functionality. The different device objects 281 are associated with different device drivers (driver(s) 282a, 282b, . . . 282n, referred to generally as device driver(s) 282). In an example, a device 240 such as a USB flash drive may have associated device objects including objects corresponding to a USB driver, a storage driver, a volume manager driver, and a file system driver for the device. The device objects 281 corresponding to a same device 240 form a layered device stack 280 for device 240. For example, for a USB device, a USB bus driver will create a device object 281a stating that a new device has been plugged in. Next, a plug-and-play (PNP) component of the operating system will search for and load the best driver for device 240, which will create another device object 281b that is layered over the previous device object 281a. The layering of device objects 281 will create device stack 280.

Device objects 281 may be stored in a memory of the server 104 associated with virtual bus driver 260. In particular, device objects 281 and resulting device stack 280 may be stored in random-access memory of server 104. Different devices 240/290 can have device stacks having different device objects and different numbers of device objects. The device stack may be ordered, such that lower level device objects (corresponding to lower level device drivers) have lower numbers than higher level device objects (corresponding to higher level device drivers). The device stack may be traversed downwards by traversing the stack from higher level objects to lower level objects. For example, in the case of an illustrative device stack 280 corresponding to a USB flash drive, the ordered device stack may be traversed downwards from a high-level file system driver device object, to a volume manager driver device object, to a storage driver device object, to a USB driver device object, and finally to a low-level virtual bus driver device object. Different device stacks 280 can be layered over each other to provide the functionality of the devices 240/290 inside devices, like USB Headsets, or USB pen drives. A USB pen drive, for example, can create a USB device stack first, over which it can create a storage device stack, where each of the device stacks have two or more device objects.

Once one or more device object(s) 281 are loaded by operating system 170 of server 104, each device object 281 can create a symbolic link (also referred to as a "device interface") to device object 281 and associated device driver 282. The symbolic link is used by applications running on server 104 to access device object 281 and device 240/290. The symbolic link can be created by a call to a function such as IoCreateSymbolicLink( ) including such arguments as a name for the symbolic link, and a name of device object 281 or associated device 240. In one example, for example, a symbolic link to a USB flash drive device 240 is created by a call from a device object 281 for device 240 to the function IoCreateSymbolicLink( ) including arguments "\\GLOBAL??\C:" (i.e., the name for the symbolic link) and "\Device\HarddiskVolume1" (i.e., a name of the device object).

The creation of a symbolic link results in an entry being created in an object manager namespace (OMN) of operating system 170. The OMN stores information on symbolic links created for and used by operating system 170, including symbolic links for devices 240, virtualized devices 290, and applications 270 running on server 104.

As a result of the symbolic link creation process, a symbolic link to device 240 is enumerated in the OMN of server 104. Once the presence of device 240 is reported to operating system 170 of server 104, device 240 may be accessible from a remote session (and associated desktop) running on server 104 (i.e., virtual desktop environment). For example, device 240 may appear as an icon on the virtual desktop environment and/or may be accessed by applications running on server 104.

An application 270 running on server 104 may access device 240 by sending a transaction request including the symbolic link for device 240 to operating system 170. Operating system 170 may consult the Object Manager Namespace to retrieve an address or other identifier for the device itself 240 or for a device object 281 associated with device 240. Using the retrieved address or identifier, operating system 170 forwards the transaction request for device 240 either directly, through a device object 281 of device stack 280, and/or through virtual bus driver 260. Virtual bus driver 260 may direct the transaction request to agent 250, which sends the transaction request to proxy 210 over network 106. Proxy 210 receives the transaction request from agent 250, and directs the received transaction request to stub driver 220. Stub driver 220 then directs the transaction request to device 240 through bus driver 230.

Bus driver 230 receives the result of the transaction request from device 240 and sends the result of the transaction request to stub driver 220. Stub driver 220 directs the result of the transaction request to proxy 210, which sends the result of the transaction request to agent 250 over network 106. Agent 250 directs the result of the transaction request to virtual bus driver 260. Virtual bus driver 260 then directs the result of the transaction request to application 270 either directly or through a device object 281 of device stack 280.

Thus, virtual bus driver 260 may receive transaction requests for device 240 from application 270 and send results of the transaction requests back to application 270 (either directly or through a device object 281 of device stack 280). As such, application 270 may interact with virtual bus driver 260 in the same way as with a bus driver for a device that is connected locally to server 104. Virtual bus driver 260 may hide the fact that it sends transaction requests to agent 250 and receives the results of the transaction requests from agent 250 instead of a device that is connected locally to server 104. As a result, device 240 connected to client 102 may appear to application 270 as if the physical device 240 is connected locally to server 104.

In accordance with USB standards, the host (e.g., a component on server 104) communicates with a USB device (or interface, endpoint, etc.) using USB request blocks (URBs). An URB is a data structure that defines, among other things, a requested function for the USB device to perform and a buffer where data for the requested function is stored. In the Windows operating system, an URB is sent to the targeted device by associating the URB with an I/O request packet (IRP).

Figure 3:
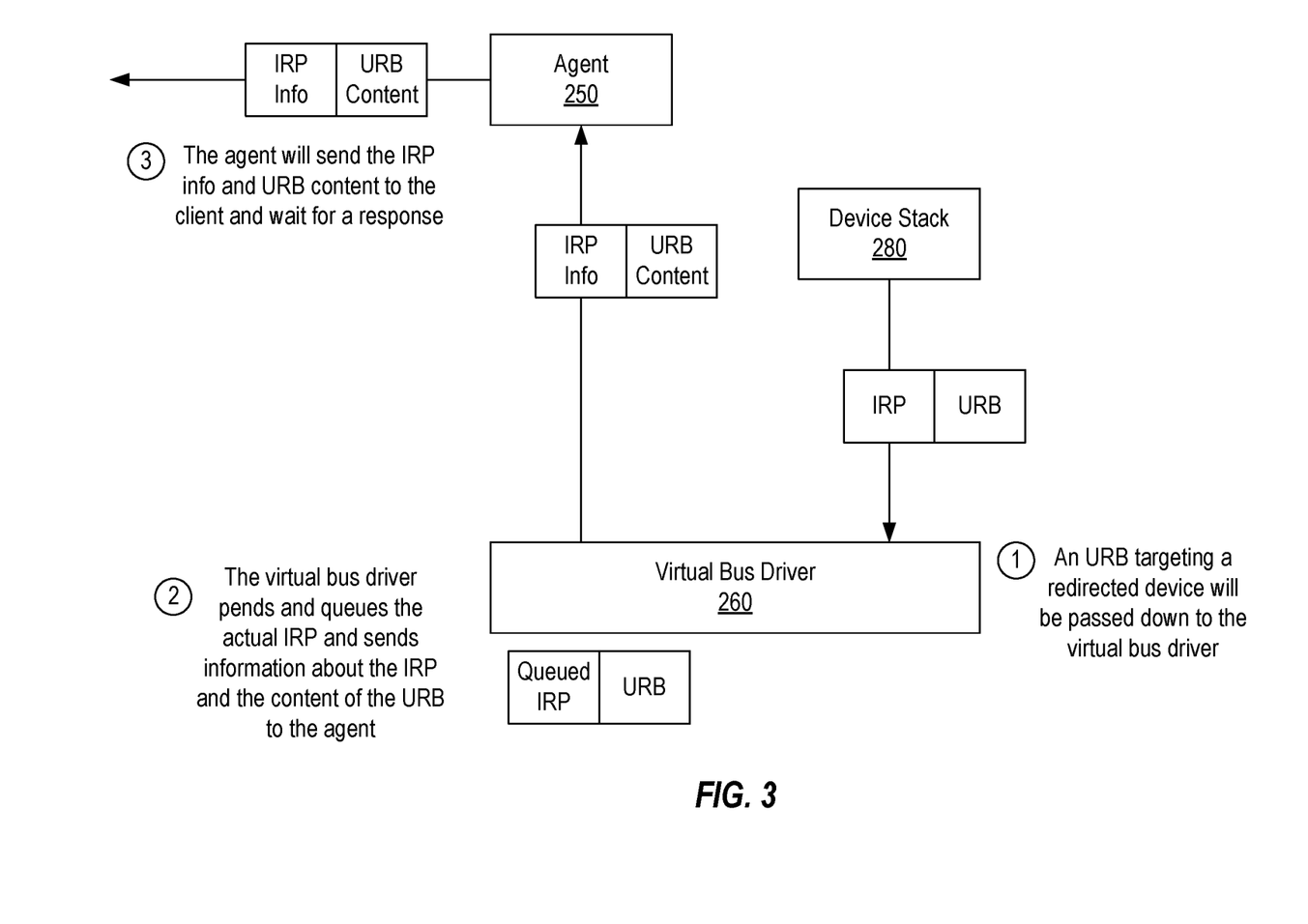
FIG. 3 illustrates how a virtual bus driver queues IRPs and their associated URBs that target a redirected USB device.

FIG. 3 provides a general overview of how virtual bus driver 260 handles an IRP and the associated URB that targets a redirected USB device. When the host attempts to access the USB device, device stack 280 will cause an IRP and an associated URB to be passed down to virtual bus driver 260. Assuming virtual bus driver 260 cannot complete the IRP with information it already has, it will mark the IRP as pending and queue it while the request is redirected. More specifically, virtual bus driver 260 will obtain sufficient information about the IRP and the content of the URB to enable an equivalent request to be created on client 102 for submission to device 240. Virtual bus driver 260 provides this IRP information and URB content to agent 250 which will then transfer it to proxy 210. While the equivalent request is being handled on client 102, the IRP will remain queued on server 104. Once agent 250 receives the corresponding response, it will be routed to virtual bus driver 260. Virtual bus driver 260 will then dequeue the IRP and complete it using the data from the response.

In a multiprocessor environment, this queueing of IRPs (and their associated URBs) can degrade the system's performance. In particular, if an URB originates from a first processor, the URB may be stored in that processor's local cache. However, because of the queueing, the completion of the URB may be handled by a second processor. In such a case, the cache line storing the URB will be invalidated before the second processor starts executing the URB completion process to maintain consistency between both processors' local caches. If the multiprocessor environment employs non-uniform memory access (NUMA), the degradation in performance can be even more severe, including causing NUMA thrashing.

Given that many VDI environments are implemented with virtual machines in a virtual NUMA (or vNUMA) architecture, these performance degradations are currently quite prevalent. Although there are APIs that applications can employ to support NUMA architectures, the use of these APIs cannot address the problems that redirection creates since the applications and higher level components are unaware of the redirection. Notably, these performance problems are unique to redirection scenarios since an URB targeting a locally connected USB device typically would be completed immediately on the same thread.

BRIEF SUMMARY

The present invention extends to methods, systems, and computer program products for increasing cache hits for URBs that target a redirected USB device. When a virtual bus driver in a VDI environment queues an IRP for an URB that targets the redirected USB device, it can ensure that the IRP and therefore the URB is completed on the same processor that originated the URB. This can be accomplished in both NUMA and non-NUMA multiprocessor environments.

In some embodiments, the present invention is implemented, by a virtual bus driver that executes on a server in a VDI environment, as a method for increasing cache hits for URBs that target a USB device that is connected to a client terminal and redirected to the server. The virtual bus driver receives an IRP that is associated with an URB that targets the USB device that is connected to the client terminal and redirected to the server. In conjunction with queuing the IRP while the URB is sent to the redirected USB device, the virtual bus driver obtains an identifier of a first processor that is currently executing and stores an association between the queued IRP and the identifier. Upon receiving a response to the URB that was sent to the redirected USB device, the virtual bus driver obtains and employs the identifier to request that a routine for completing the IRP be executed by the first processor. As the first processor executes the routine, the IRP is completed using the response to the URB.

In other embodiments, the present invention is implemented as a method for increasing cache hits for URBs that target a USB device that is connected to a client terminal and redirected to the server. IRPs are received, each of which is associated with an URB that targets a USB device that is connected to a client terminal and redirected to the server. For each IRP, the method includes: queueing the IRP; obtaining an identifier of a current processor; storing an association between the queued IRP and the identifier; sending the associated URB to the client terminal to which the targeted USB device is connected; upon receiving a response to the associated URB, obtaining and employing the corresponding identifier of the current processor to request that a routine for completing the IRP be executed by the same processor; and as the same processor executes the routine, completing the IRP using the response to the associated URB.

In other embodiments, the present invention is implemented as a method for increasing cache hits for URBs that target a USB device that is connected to a client terminal and redirected to the server. An IRP is received. The IRP is associated with an URB that targets the USB device that is connected to the client terminal and redirected to the server. The IRP is then queued and the URB is sent to the client terminal for submission to the redirected USB device. An identifier of a first processor that is currently executing is obtained and an association between the queued IRP and the identifier is stored. Upon receiving a response to the URB that was sent to the redirected USB device, the identifier is obtained and employed to request that a routine for completing the IRP be executed by the first processor. As the first processor executes the routine, the IRP is completed using the response to the URB.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In this specification and the claims, the phrase "completing the URB," "completing the IRP," and their variants should be construed as encompassing the processing that the server-side I/O system performs on an IRP and the associated URB which results in the completion of the function defined in the URB. For example, completing an URB that defines a request to read data from a bulk endpoint of a USB device would encompass completing the associated IRP to cause the read data to be returned to the application or component that initiated the read.

The present invention can be implemented by a virtual bus driver that executes on a server in a VDI environment. For example, virtual bus driver 260 can be configured to perform the inventive process for increasing cache hits for URBs that target device 240. As indicated above, the present invention can be particularly beneficial when server 104 (which may be a physical or virtual machine) has a NUMA architecture. However, the present invention could be implemented when server 104 has any type of multiprocessor architecture.

FIGS. 4A-4F illustrate how virtual bus driver 260 can increase cache hits for URBs that target a redirected USB device. For simplicity, it will be assumed that device 240 is the only USB device that is redirected to server 104. However, it is to be understood that any number of devices connected to any number of client terminals 102 could be redirected to server 104, and virtual bus driver 260 could perform the same technique to increase cache hits for URBs targeting any of these devices.

Figure 4A:
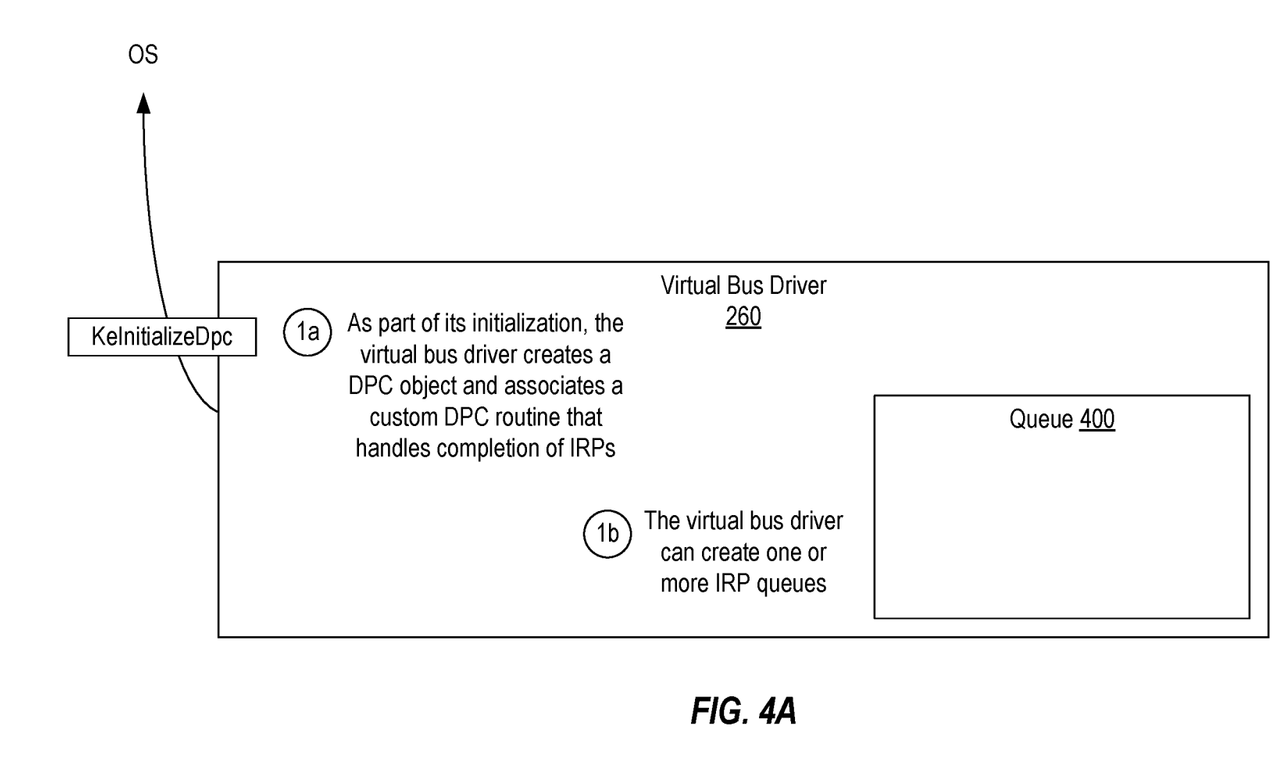
FIGS. 4A-4F illustrate how the present invention can ensure that an URB is completed on the same processor on which it was originated.

FIG. 4A represents processing that virtual bus driver 260 can perform during its initialization or at least prior to handling IRPs targeting redirected USB devices. In step 1a, virtual bus driver 260 can create a deferred procedure call (DPC) object and register a custom DPC routine for the DPC object. In Windows, this can be accomplished by calling the KeInitializeDpc function and passing a pointer to the custom DPC routine. Importantly, virtual bus driver 260 can identify its IRP completion routine as the custom DPC routine (or at least the IRP completion routine that it uses to complete IRPs that have been queued while the request is routed to a redirected USB device). As is known, DPC is a Windows mechanism that allows a driver to defer processing of particular tasks (i.e., the tasks performed in the specified custom DPC routine). It is commonly used by drivers as a means to allow its high-priority tasks (e.g., interrupt handlers) to be completed immediately while delaying its low-priority tasks until after the operating system has completed other higher-priority tasks. The result of step 1a will be that virtual bus driver 260 will be able to schedule the execution of its IRP completion routine as a DPC.

Additionally, virtual bus driver 260 can create one or more IRP queues (e.g., queue 400) in which it can store pended IRPs pertaining to a redirected USB device. Virtual bus driver 260 can employ any suitable queue for this purpose. For example, the Windows I/O manager may automatically create a device queue object for virtual bus driver 260 which could be used as queue 400. Alternatively or additionally, virtual bus driver 260 could implement its own internal IRP queue(s) such as by calling the KeInitializeDeviceQueue function. In any case, queue 400 can represent a queueing mechanism that allows virtual bus driver 260 to queue IRPs that it has pended.

After initialization, virtual bus driver 260 can commence receiving IRPs associated with URBs that target a redirected USB device. For example, in step 2a shown in FIG. 4B, virtual bus driver 260 receives an IRP and an associated URB, and then in step 2b, it is assumed that virtual bus driver 260 determines that the URB must be submitted to device 240 (e.g., because the URB is a read or write request). It is noted that, in some cases, virtual bus driver 260 may be able to complete an URB directly using information it has already obtained from the redirected device.

Figure 4B:
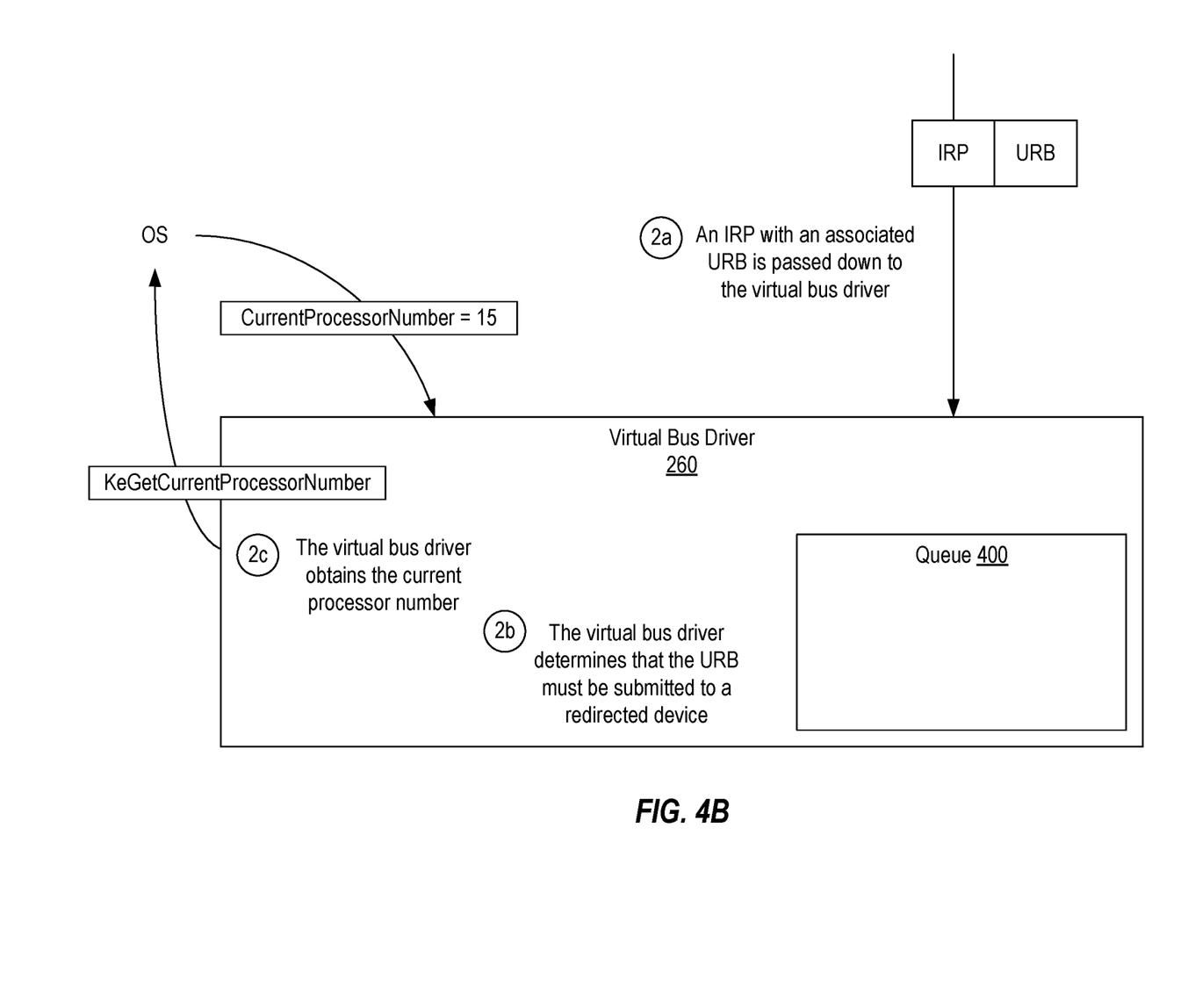

In conjunction with determining that the URB must be submitted to the redirected device, and in step 2c, virtual bus driver 260 can obtain the current processor number (i.e., the number of the processor on which virtual bus driver 260 is currently being executed). In some embodiments, virtual bus driver 260 can accomplish this by calling the KeGetCurrentProcessorNumber function (or the KeGetCurrentProcessorNumberEx function) which will return a number representing the current processor. In this example, it will be assumed that the current processor is defined by the number 15.

Figure 4C:
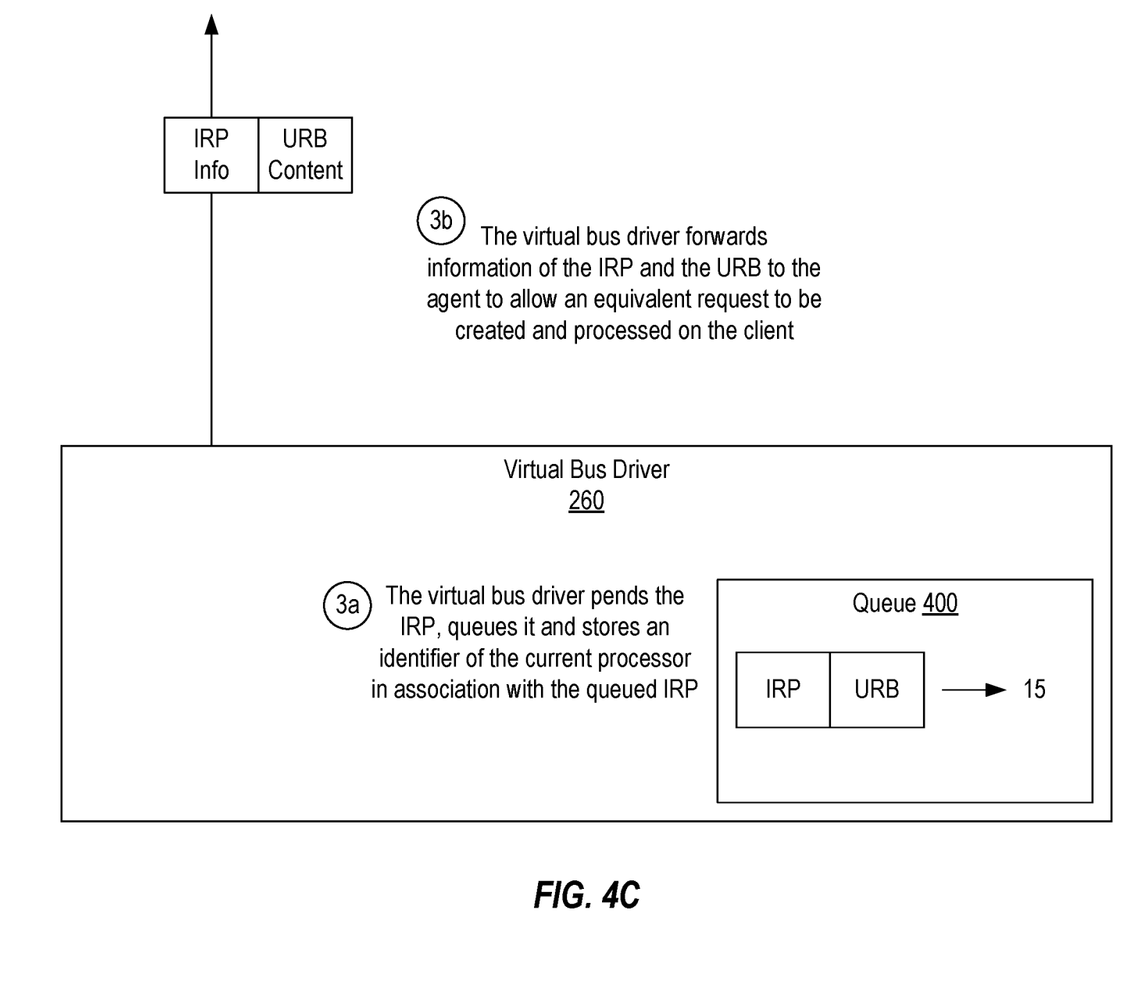

Turning to FIG. 4C, in step 3a, virtual bus driver 260 can pend the IRP and store it in queue 400 in association with the received processor number. For example, virtual bus driver 260 can call the IoMarkIrpPending function on the IRP and then queue the IRP by calling an appropriate function such as KeInsertDeviceQueue. Any suitable technique can be employed to maintain an association between the queued IRP and the processor number. In conjunction with queuing the IRP, in step 3b, virtual bus driver 260 can also send information about the IRP and the content of the URB to agent 250 which will forward this information and content to proxy 210 to allow an equivalent request to be created on client terminal 102.

Figure 4D:
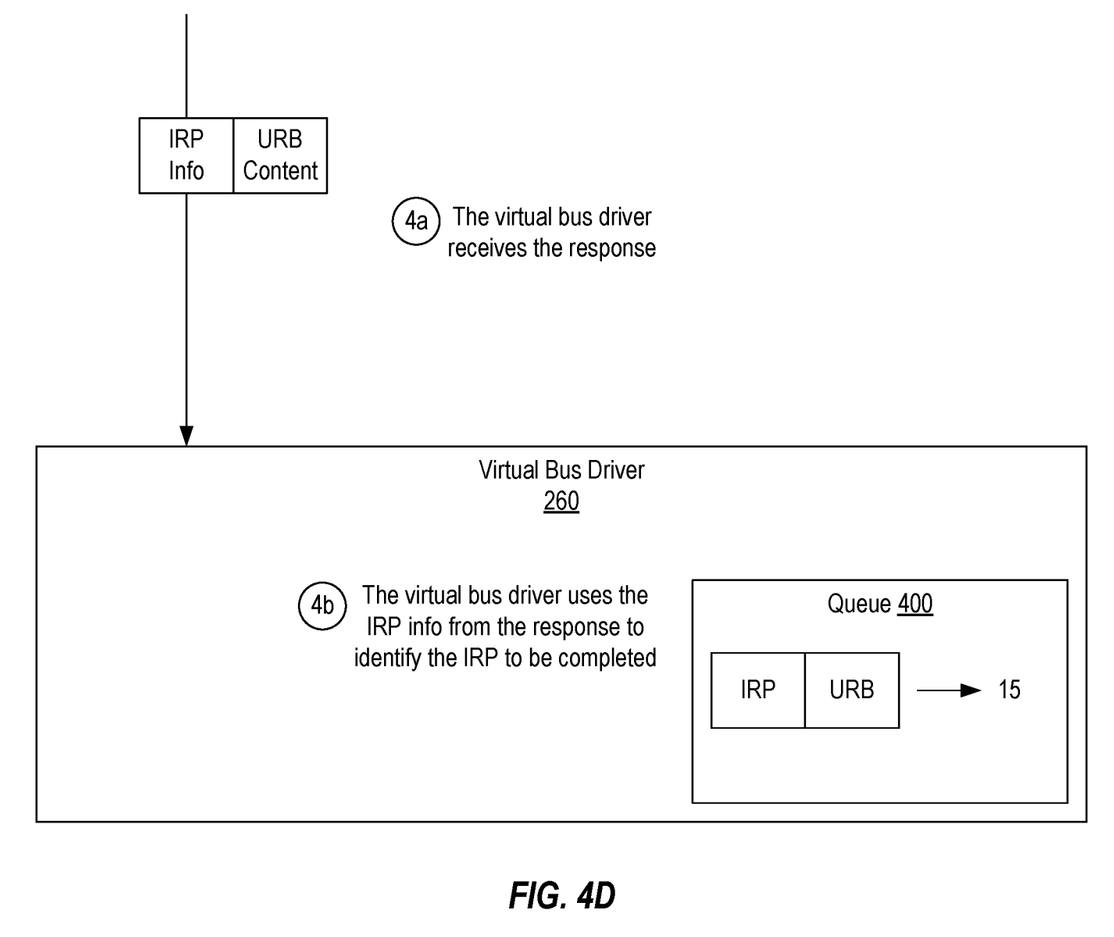

The IRP will remain queued while the equivalent request is being completed on client terminal 102 and until the corresponding response is routed back to virtual bus driver 260 as is represented in step 4a of FIG. 4D. Then, in step 4b, virtual bus driver 260 can employ the IRP information passed back to it by agent 250 to identify the corresponding IRP in queue 400. As mentioned above, virtual bus driver 260 typically would be implementing this process for a number of redirected devices, and therefore, there may be multiple queued IRPs in any number of queues at any given time. The IRP information provided back to virtual bus driver 260 allows it to identify to which of these potentially multiple queued IRPs the response pertains. For simplicity, it will be assumed that the IRP information in the response corresponds to the depicted IRP in queue 400.

Figure 4E:
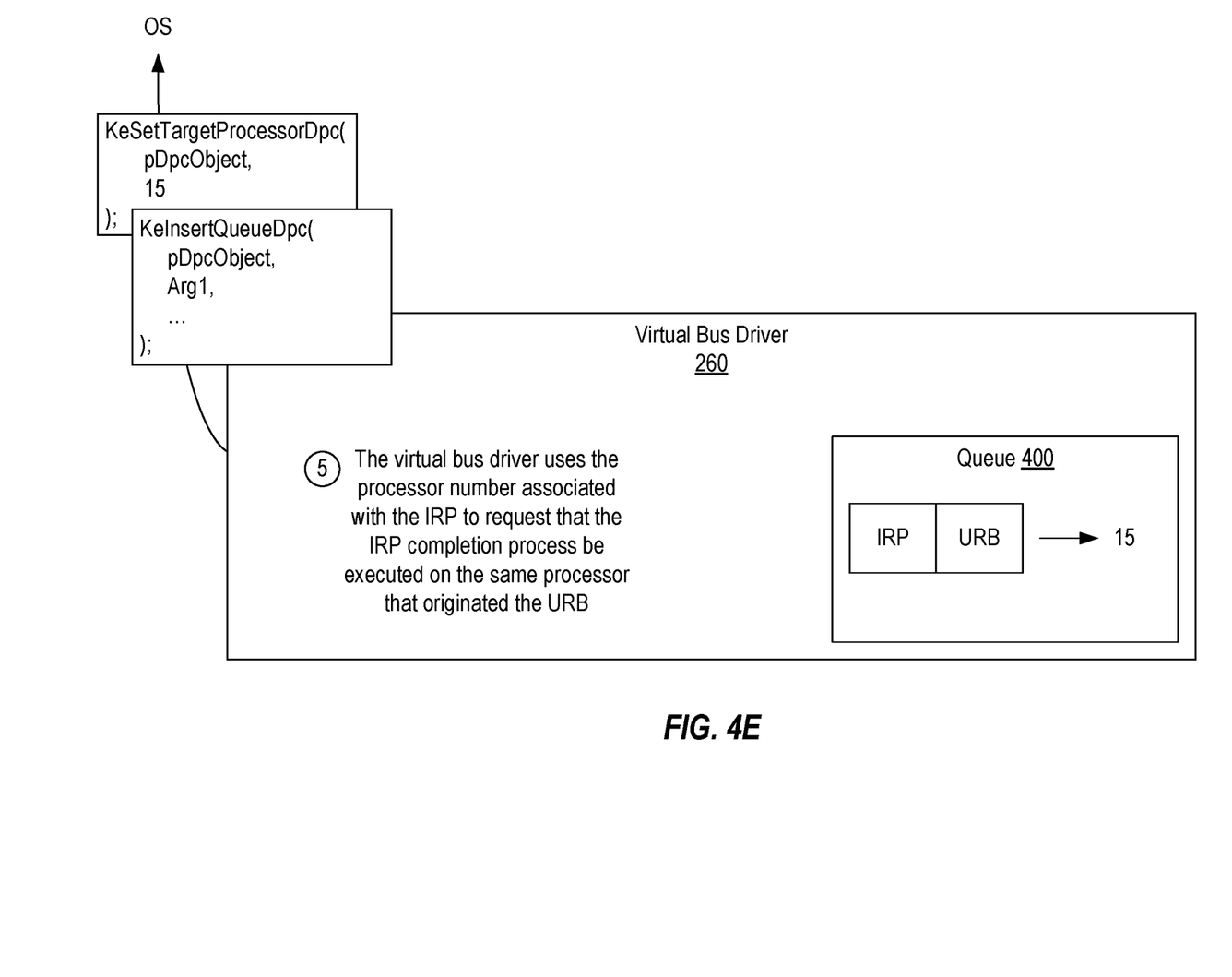

In step 5, shown in FIG. 4E, to ensure that the completion of the URB occurs on processor number 15, virtual bus driver 260 can employ the DPC object it previously created to queue its custom DPC routine, which is the IRP completion routine, for execution. More specifically, virtual bus driver 260 can first call the KeSetTargetProcessorDpc function and specify as inputs a pointer to virtual bus driver 260's DPC object and the number of the processor that virtual bus driver 260 stored for this IRP (which is 15 in this example). Virtual bus driver 260 can then call the KeInsert- QueueDpc function and specify as inputs the pointer to the DPC object and any additional arguments. In some embodiments, these additional arguments can include at least some of the IRP information which will allow virtual bus driver 260 to identify the correct IRP once the custom DPC routine is executed. Because the call to KeSetTargetProcessorDpc specified processor number 15, the custom DPC will be assigned to processor number 15's DPC queue (there is one DPC queue per processor) rather than to the currently active processor's DPC queue.

Finally, because virtual bus driver 260's DPC routine was added to processor 15's DPC queue, virtual bus driver 260's custom DPC routine—the IRP completion routine—will be executed on processor 15. Once the IRP completion routine is executed, it may employ any inputs provided to the call to KeInsertQueueDpc to identify which queued IRP should be completed and may then proceed to complete the IRP. As shown in step 6 of FIG. 4F, virtual bus driver 260's completion of the IRP will cause the IRP and the associated URB (which may now be modified to include any data retrieved from the redirected device) to be passed back up device stack 280.

Figure 4F:
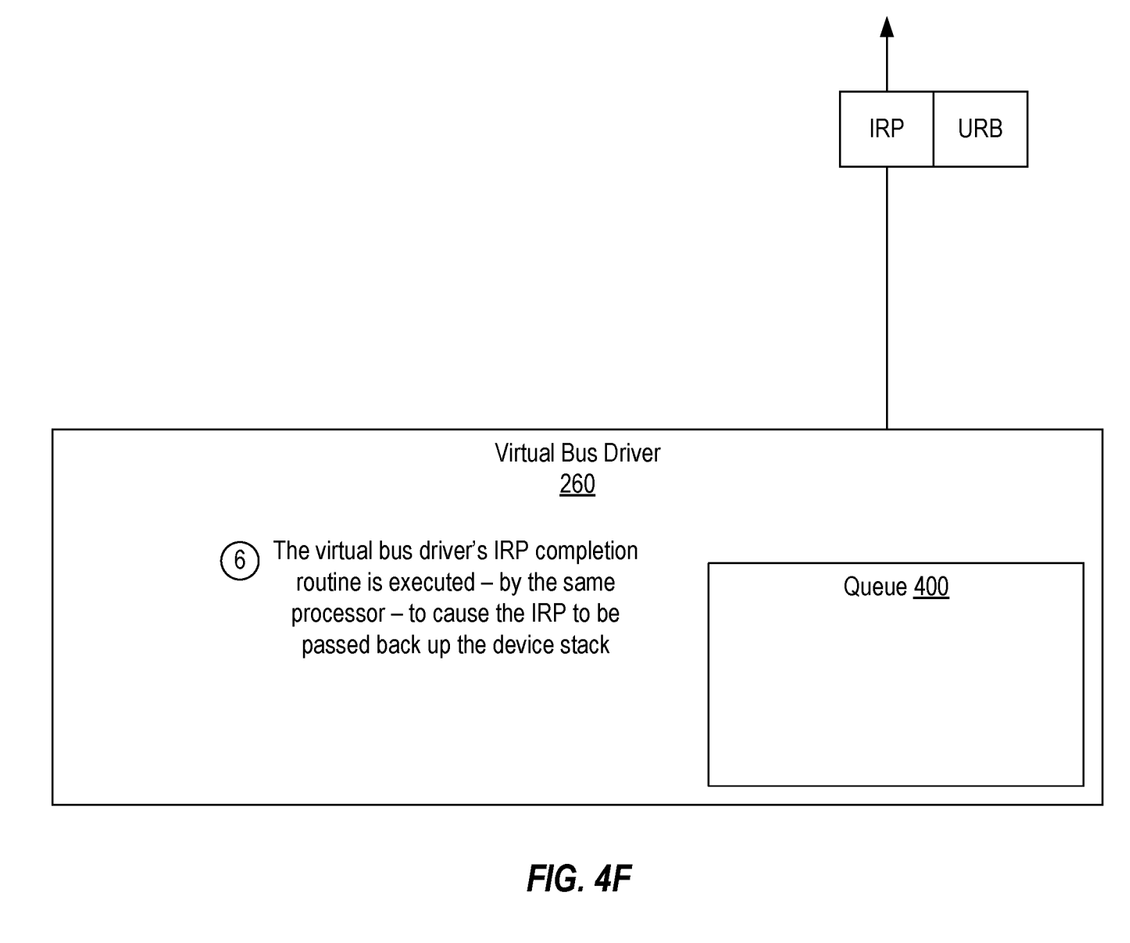

Importantly, this process of passing the IRP back up device stack 280 and ultimately the delivery of any response data back to the requesting application will occur on processor 15. Because the URB was originated on processor 15, the URB structure (as well as the associated IRP structures) should be stored in processor 15's cache thereby resulting in a cache hit. In contrast, if the URB were completed on a different processor, the URB structure would need to be loaded into the different processor's cache, and processor 15's cache line containing the URB structure would need to be invalidated to ensure consistency with the different processor's cache.

Various testing has been conducted to measure the performance improvements the present invention provides. This testing included submitting requests in a non-NUMA multiprocessor environment to sequentially read 4k from a redirected device. On average, when the virtual bus driver implemented the techniques of the present invention, a 7% performance increase was consistently observed. Even greater improvements would be expected in a NUMA environment. Considering that VDI environments oftentimes involve the redirection of many USB devices to a server, the present invention will allow the number of redirected devices to be scaled up without consuming excessive processor cycles and with minimal NUMA penalties.

Figure 5:
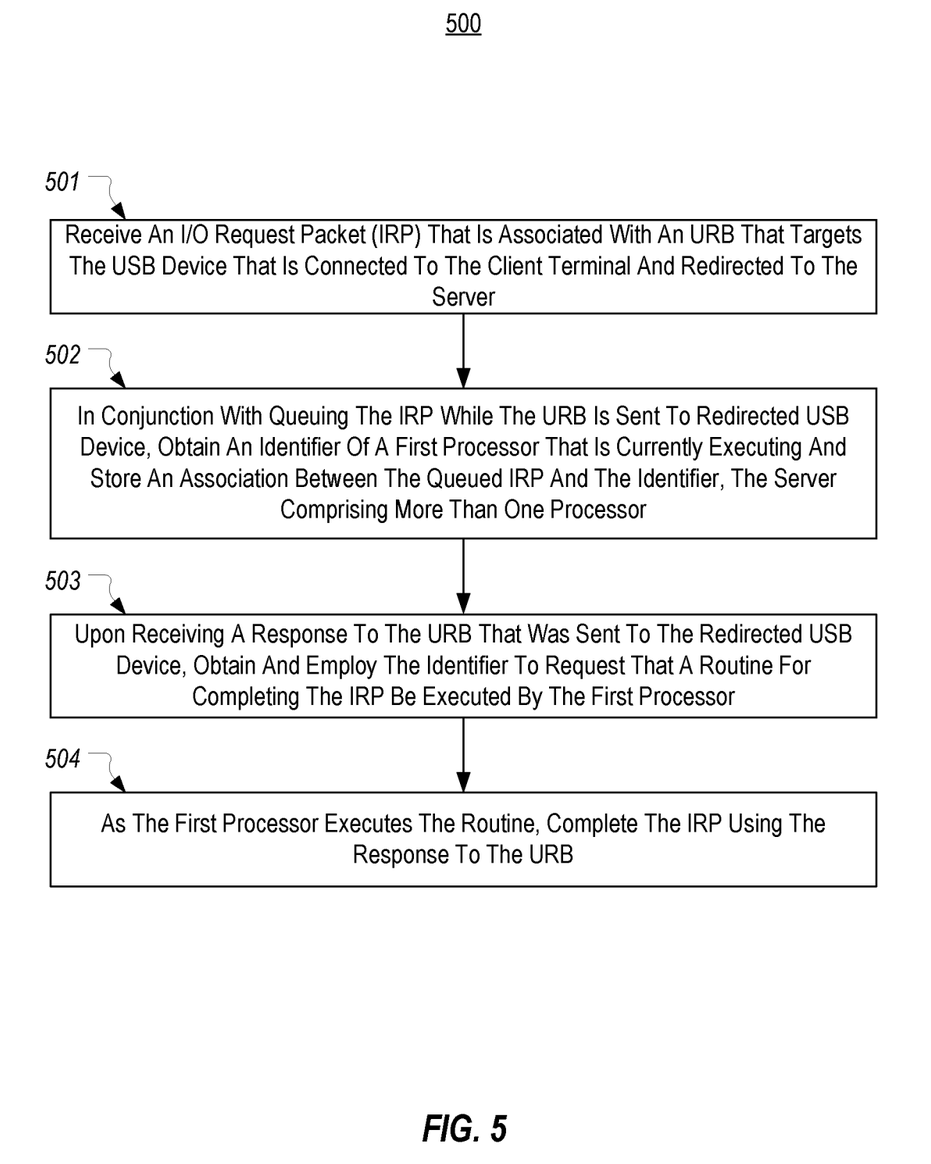
FIG. 5 illustrates a flowchart of an example method for increasing cache hits for URBs that target a USB device that is connected to a client terminal and redirected to the server.

FIG. 5 provides a flowchart of an example method 500 for increasing cache hits for URBs that target a USB device that is connected to a client terminal and redirected to the server. Method 500 can be implemented in a VDI environment such as by virtual bus driver 260.

Method 500 includes an act 501 of receiving an IRP that is associated with an URB that targets the USB device that is connected to the client terminal and redirected to the server. For example, virtual bus driver 260 can receive a request to read data from device 240.

Method 500 includes an act 502 of, in conjunction with queuing the IRP while the URB is sent to the redirected USB device, obtaining an identifier of a first processor that is currently executing and storing an association between the queued IRP and the identifier, the server comprising more than one processor. For example, virtual bus driver 260 can call the KeGetCurrentProcessorNumber function and store the return value in association with the queued IRP.

Method 500 includes an act 503 of, upon receiving a response to the URB that was sent to the redirected USB device, obtaining and employing the identifier to request that a routine for completing the IRP be executed by the first processor. For example, virtual bus driver 260 can call KeSetTargetProcessorDpc and pass in the identifier as input and then call KeInsertQueueDpc.

Method 500 includes an act 504 of completing the IRP using the response to the URB as the first processor executes the routine. For example, virtual bus driver 260 can pass the IRP back up device stack 280.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, implemented by a virtual bus driver that executes on a server in a virtual desktop infrastructure (VDI)

environment, for increasing cache hits for universal serial bus (USB) request blocks (URBs) that target a USB device that is connected to a client terminal and redirected to the server, the method comprising:

receiving, at the virtual bus driver that executes on the server, an I/O request packet (IRP) that is associated with an URB that targets the USB device that is connected to the client terminal and redirected to the server;

in conjunction with queuing the IRP while the URB is sent to the redirected USB device that is connected to the client terminal such that the URB is sent over a network to the client terminal while the IRP is queued, obtaining an identifier of a first processor that is currently executing and storing an association between the queued IRP and the identifier, the server comprising more than one processor;

upon receiving, from the client terminal, a response to the URB that was sent to the redirected USB device, obtaining and employing the identifier to request that a routine for completing the IRP be executed by the first processor; and as the first processor executes the routine, completing the IRP using the response to the URB that was received from the client terminal.

2. The method of claim 1, wherein queuing the IRP includes marking the IRP as pending.

3. The method of claim 1, wherein the queue is an internal queue managed by the virtual bus driver.

4. The method of claim 1, wherein sending the URB to the redirected USB device comprises sending, to a server-side agent, information about the IRP and contents of the URB to enable an equivalent request to be created on the client terminal for submission to the redirected USB device.

5. The method of claim 1, further comprising:
while the IRP is queued, queueing one or more additional IRPs, each of which targets a USB device that is redirected to the server, and storing an identifier of a current processor with each of the additional IRPs.

6. The method of claim 1, further comprising:
creating a deferred procedure call (DPC) object and associating the routine with the DPC object.

7. The method of claim 6, wherein employing the identifier to request that the routine for completing the IRP be executed by the first processor comprises calling a function to cause the DPC object to be inserted into a DPC queue of the first processor.

8. The method of claim 7, wherein employing the identifier to request that the routine for completing the IRP be executed by the first processor further comprises calling a function that specifies that the routine is to be executed on the first processor prior to calling the function to cause the DPC object to be inserted into the DPC queue of the first processor.

9. The method of claim 1, wherein completing the IRP using the response to the URB comprises populating content of the response into the URB.

10. The method of claim 1, wherein the server comprises a non-uniform memory access (NUMA) architecture.

11. One or more computer storage media storing computer-executable instructions which when executed on a server in a multiprocessor environment implement a method for increasing cache hits for universal serial bus (USB) request blocks (URBs) that target a USB device that is connected to a client terminal and redirected to the server, the method comprising:

Receiving, at a virtual bus driver that executes on the server, I/O request packets (IRPs) each of which is associated with an URB that targets a USB device that is connected to a client terminal and redirected to the server;

for each IRP:
queueing the IRP;
in conjunction with queuing the IPR, obtaining an identifier of a current processor;
storing an association between the queued IRP and the identifier;
while the IRP is queued, sending the associated URB to the client terminal to which the targeted USB device is connected;
upon receiving a response to the associated URB, obtaining and employing the corresponding identifier of the current processor to request that a routine for completing the IRP be executed by the same processor; and
as the same processor executes the routine, completing the IRP using the response to the associated URB.

12. The computer storage media of claim 11, wherein the method further comprises:
creating a deferred procedure call (DPC) object and associating the routine with the DPC object.

13. The computer storage media of claim 12, wherein employing the corresponding identifier to request that the routine for completing the IRP be executed by the same processor comprises calling a function to cause the DPC object to be inserted into a DPC queue of the same processor.

14. The computer storage media of claim 13, wherein employing the corresponding identifier to request that the routine for completing the IRP be executed by the same processor further comprises calling a function that specifies that the routine is to be executed on the same processor prior to calling the function to cause the DPC object to be inserted into the DPC queue of the same processor.

15. The computer storage media of claim 11, wherein completing the IRP using the response to the associated URB comprises populating content of the response into the associated URB.

16. The computer storage media of claim 11, wherein queuing the IRP includes marking the IRP as pending.

17. The computer storage media of claim 11, wherein the IRPs are queued in one or more internal queues.

18. A method for increasing cache hits for universal serial bus (USB) request blocks (URBs) that target a USB device that is connected to a client terminal and redirected to the server, the method comprising:

receiving, at a virtual bus driver that executes on the server, an I/O request packet (IRP) that is associated with an URB that targets the USB device that is connected to the client terminal and redirected to the server;

queuing the IRP;
while the IRP is queued, sending the URB to the client terminal for submission to the redirected USB device;
in conjunction with queuing the IRP while the URB is sent to the client terminal for submission to the redirected USB device, obtaining an identifier of a first processor that is currently executing and storing an association between the queued IRP and the identifier, the server comprising more than one processor;
upon receiving a response to the URB that was sent to the redirected USB device, obtaining and employing the identifier to request that a routine for completing the IRP be executed by the first processor; and as the first processor executes the routine, completing the IRP using the response to the URB.

19. The method of claim 18, wherein employing the identifier to request that the routine for completing the IRP be executed by the first processor comprises calling a function to cause a DPC object to be inserted into a DPC queue of the first processor.

20. The method of claim 19, wherein employing the identifier to request that the routine for completing the IRP be executed by the first processor further comprises calling a function that specifies that the routine is to be executed on the first processor prior to calling the function to cause the DPC object to be inserted into the DPC queue of the first processor.

* * * * *